United States Patent [19]

Brandl et al.

[11] 4,382,482

[45] May 10, 1983

[54] SECONDARY HOOD LATCH

[75] Inventors: Michael C. Brandl, Westmont; Charles H. Holm, Plainfield; David T. Kataoka, Berwyn, all of Ill.

[73] Assignee: International Harvester Co., Chicago, Ill.

[21] Appl. No.: 263,372

[22] Filed: May 13, 1981

[51] Int. Cl.[3] .......................... B62D 25/10; E05C 3/34

[52] U.S. Cl. .................................... 180/69 R; 292/28; 292/31; 292/50; 292/54; 292/DIG. 14; 180/89.17

[58] Field of Search ................... 292/28, 50, 125, 225, 292/DIG. 14, DIG. 62, 29, 31, 54; 180/69 R, 89.17

[56] References Cited

U.S. PATENT DOCUMENTS

| | | | |
|---|---|---|---|
| 2,246,791 | 6/1941 | Dall | 292/DIG. 14 X |
| 2,246,794 | 6/1941 | Dall | 292/DIG. 14 X |
| 2,256,465 | 9/1941 | Brubaker | 292/28 |
| 2,756,085 | 7/1956 | Hochstadt | 292/54 X |
| 2,793,061 | 5/1957 | Dall | 292/DIG. 14 X |
| 3,397,906 | 8/1968 | Beckman et al. | 292/29 |
| 3,487,887 | 1/1970 | Pensa | 296/76 X |
| 4,270,623 | 6/1981 | Brandl et al. | 180/89.17 X |

FOREIGN PATENT DOCUMENTS

| | | | |
|---|---|---|---|
| 272814 | 3/1930 | Italy | 292/29 |

*Primary Examiner*—Thomas J. Holfo
*Assistant Examiner*—R. Illich
*Attorney, Agent, or Firm*—F. David Aubuchon

[57] ABSTRACT

Primary and secondary hood latches are used on a tractor hood assembly designed to roll forward on the tractor frame. Both the primary and secondary latches are unlatched through the use of either a cable operated or a lever operated independent linkage means. Both latches must be unlatched in order to allow the hood to be opened while either latch may be used to maintain the hood in a closed position.

10 Claims, 5 Drawing Figures

SECONDARY HOOD LATCH

A tractor vehicle is provided with a primary and a secondary latch operated through a single release cable. More specifically, the secondary latch serves as a backup latch upon inadvertent release of the primary latch. The secondary latch is operable after lost motion in the latch mechanism is taken up.

The latch mechanism of the instant invention is a refinement of the primary hood latch used on contemporary articulated tractors. These tractors are provided with a center pivot between a front mounted engine and a rear mounted cab. The engine compartment is enclosed with a substantial hood enveloping the engine compartment on both sides, the top and the front grille. In order to provide engine access the forward section of the hood is carried on rollers guided in tracks that allow the hood to be rolled forward on the tracks thus providing engine access.

When the hood is rolled back into a closed position a latch is engaged automatically restraining the hood from rolling forward on the rollers. The latch mechanism—now referred to as the primary latch—is relatively conventional in construction.

This invention presents an improvement of the primary latch through the addition of a secondary latch cooperating and integral with the primary latch.

The primary latch comprises an alignment assuring hood latch bolt mounted horizontally that serves to align the leading edge of the rear tractor hood with the trailing edge of the front hood. It is also spring loaded to maintain tension between the front hood section and the rear hood section when the hood is rolled into the closed position. The spring further urges the front hood section away from the rear hood section upon release of the primary and secondary latches to prevent undesirable relatching when unlatching is desired.

The secondary latch is released before the primary latch is released upon the pulling of an outboard cable release handle located on the front side lower portion of the tractor.

An alternative hood release handle is also provided enabling the primary and secondary latches to be opened from the top side of the tractor hood.

It is among the objects of this invention to provide a secondary hood latch to complement a primary hood latch in a tractor vehicle hood restraint system where a portion of the tractor's hood is mounted on roller tracks and slides forward to open.

Another object of this invention is to provide a secondary hood latch that is cable operated to open prior to unlatching a primary hood latch through the use of a single actuating pull cable connected to the secondary latch and indirectly through a lost motion linkage to the primary hood latch.

Also an object of this invention is to provide a secondary hood latch that will not allow the hood to open more than a nominal amount upon release of the primary latch if the hood has not opened more than this nominal amount.

Also an object of this invention is a provision for providing a hood release that must be pulled for a quantum time before it is released in order to allow the hood to be rolled past the mating hook of the secondary latch mechanism.

These and other advantages and objects of this invention will be apparent from a perusal of the accompanying drawings and description in which.

The tractor vehicle generally 10 is an articulated tractor supported on four drive wheels such as 12. A cab 14 resides on the rear section while the engine (not seen) is carried on a front portion of the vehicle generally 16. The front and rear sections are pivotally connected around a hidden pivot point in the area 20 in front of the cab.

Figure 1:
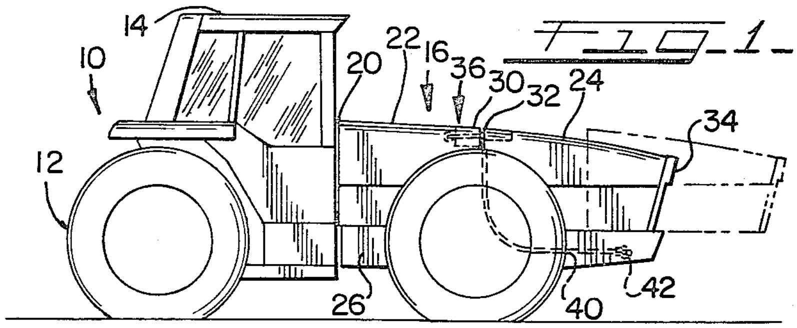
FIG. 1 represents an articulated tractor in elevation with a dotted line representation of an open hood position.

The front portion generally 16 has two hood sections, a rear hood 22 and a front hood 24 supported on a frame 26. The rear hood extends from one side of the engine compartment upward to a top portion, across the engine compartment and downwardly to the left side frame of the tractor. A leading edge 30 of the rear hood will normally be adjacent a trailing edge 32 of the front hood 24. The front hood 24 is mounted on rollers supported in guides that allows the front hood to be rolled forward for engine access to the position shown in the broken line view of FIG. 1. The front hood 24, like the rear hood 22 encloses the sides and top of the engine compartment as well as housing the front grille section 34.

A portion of the latch mechanism of this disclosure is fastened to the top sheet metal of the rear hood in the general location 36. The latch incorporates several component parts carried on the front hood section for engagement with components on the rear section. The pull cable 40 is routed to the forward right side frame location where a "T-handle" 42 is provided for releasing the primary and secondary latches upon displacement.

Figure 2:
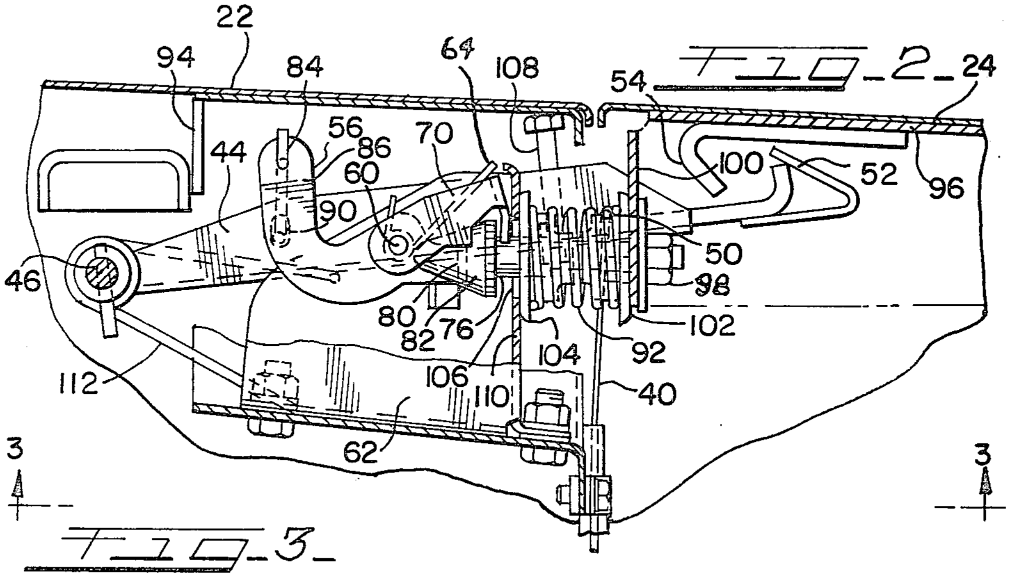
FIG. 2 is an elevation view of the primary and secondary latches attached to a broken away portion of the host vehicle.
Figure 4:
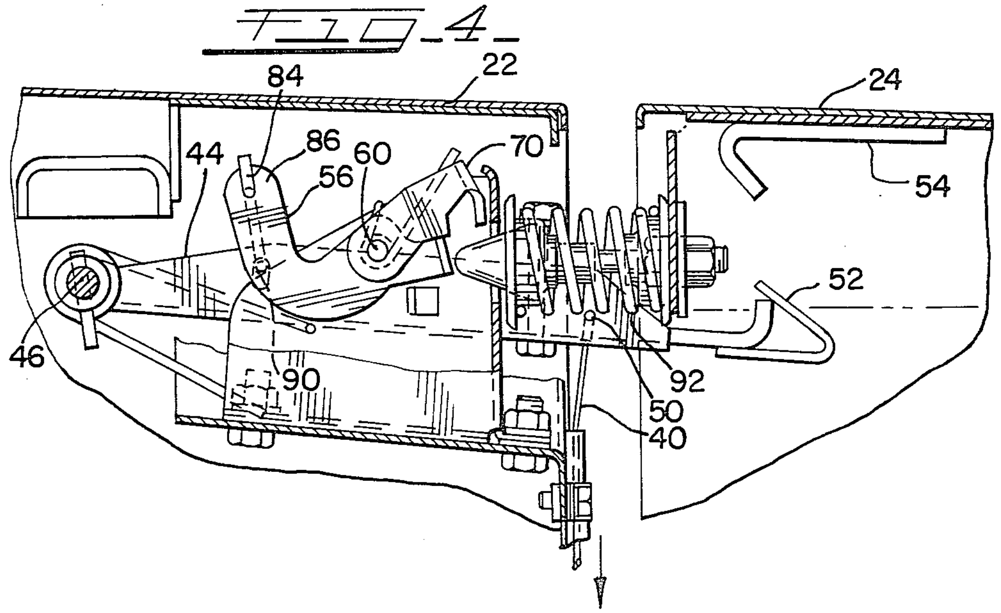
FIG. 4 is a view similar to FIG. 2 with the hood partially rolled open.
Figure 5:
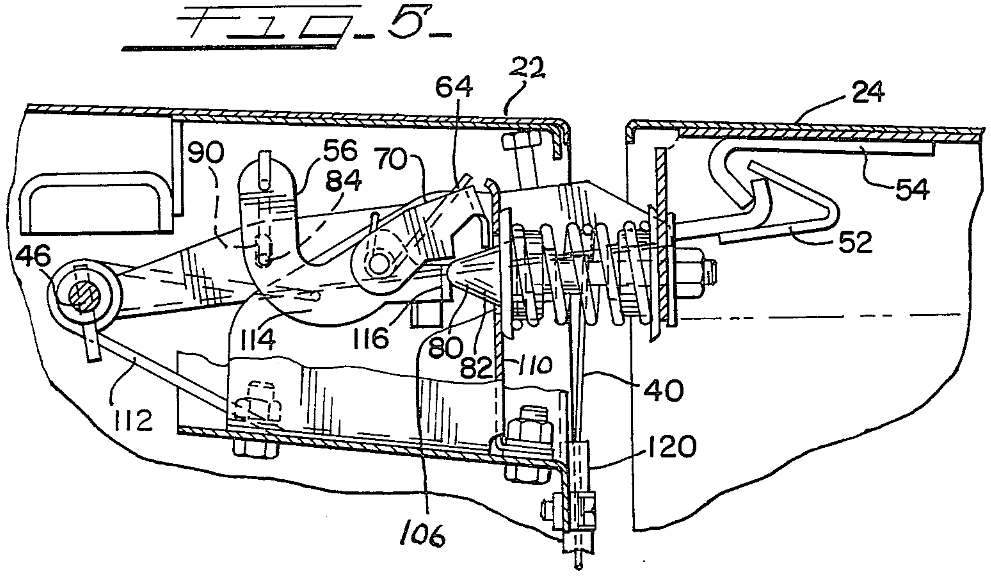
FIG. 5 is a view of FIG. 2 with the hood partially rolled open and latched with the secondary latch.

In FIGS. 2, 4 and 5 the latch mechanism is shown in a latched (FIG. 2), an unlatched (FIG. 4) and partially relatched (FIG. 5) position. All the same components are identified by the same reference character in each figure.

The unlatching process is initiated when the tractor operator stops the tractor, sets the parking brake, turns off the engine and pulls the T-handle 42. The pull cable 40, which is attached to the rear pivoted secondary latch 44, pivoting about secondary latch pivot point 46, at attachment point 50 will pull the secondary latch 44 relatively downward toward the position shown in FIG. 4. After a short displaced distance—in a preferred embodiment approximately 160 mm or in the range of 150 mm to 170 mm—the secondary latch will pivot around the secondary latch pivot point 46 sufficiently far to have its latch hook end 52 clear the hook 54 which is attached to the inside of the front hood 24. The hook 54 has an inclined face portion and a hook bite projecting toward the front of the vehicle for engagement with the latch hook 52.

Figure 3:
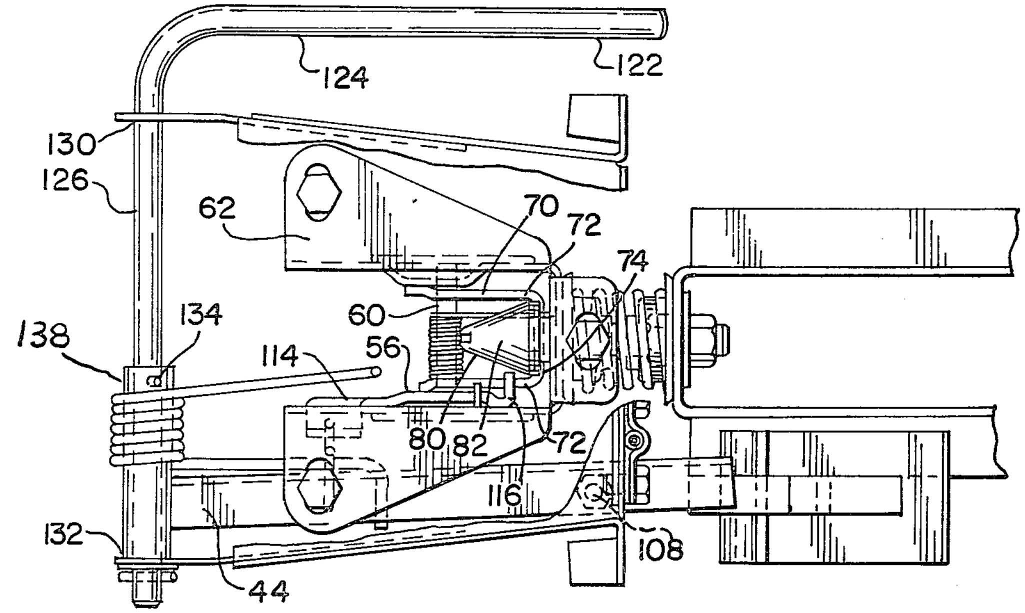
FIG. 3 is a bottom view of the primary and secondary latches mounted to a broken away section of the host vehicle.

The primary hood latch 56 is a multi-component assembly that is pivotally carried on primary pivot point 60 which is in turn supported on the primary latch housing 62 best seen in FIG. 3. The primary hood latch 56 is spring loaded by spring 64 to a position engaging a hood latch bolt 80 when latched. The primary hood latch is comprised of two basic components. A generally U-shaped (top view) catch portion 70 has legs 72 connected by a transition piece 74 that can engage clearance 76 of a hood latch bolt 80 behind the nosepiece 82 of the bolt 80. The U-shaped catch 70 will be rotated upwardly when unlatching bell crank lever 114 tab 116 contacts one of the legs of the U-shaped catch 70.

As the primary hood latch 56 is connected by linkage means 84 to a connecting link 86 but through a lost motion developing slot 90 the primary hood latch 56 will start to be unlatched in a progressive manner after the lost motion is taken up, upon further displacement of the T-handle 42. This further displacement, on the order of 160 mm or in a range of 150 mm to 170 mm—more, will disengage the primary hood latch 56 from engagement with the nose 82 of the hood latch bolt 80. The linkage means 84 will bottom out at the upper end of the lost motion developing slot 90 pulling downward on the connecting link 86 to lift the catch 70.

A total displacement of the "T-handle" of approximately 320 mm will fully unlatch the hood so that spring 92 can push the front hood section 24 away from the rear hood 22. The hood release T-handle must be held in the displaced position until the hood moves at least approximately 20 mm to enable the latch hook end 52 to clear the hook 54.

Both the primary hood latch 56 and the secondary hood latch 44 are carried on a bracket 94 which is welded to rear section hood 22. A front hood bracket 96 is fastened to the front hood 22 and in addition to the hook 54 it also supports and provides a mounting flange 100 for the hood latch bolt 80 and the spring 92 which are carried between alignment spacers 102 and 104. Each alignment spacer 102 and 104 have the center portion recessed away from the spring contacting faces with an aperture therein for fitting around the shaft of the hood latch bolt 80 but preventing the spring 92 from extending past the forward part of the nosepiece. The hood latch bolt 80 is retained by means of nut 98 in a relatively horizontal displacement generally in line with a longitudinal center line of the tractor.

When in a latched position as shown in FIG. 2 it can be seen that the nose 82 of the hood latch bolt 80 projects through an aperture 106 in an upwardly extending guide plate 110. Another alignment element is the adjustable stop 108 fastened to the secondary latch 44 which is used to locate the secondary latch 44 for optimum engagement position with the mating hook 54. The adjustment stop 108 prevents the latch hook end from going too far toward the inside of the front hood due to the effect of torsion spring 112 so that upon displacement of the T-handle the secondary latch will unlatch.

Turning to FIGS. 4 and 5. They simply show various stages of hood unlatched/latched modes. FIG. 4 shows both the primary 56 and secondary 44 latches disengaged and the spring 92 extended fully to its maximum constrained length. The front hood 24 has been urged sufficiently far away from the back hood 22 in this figure to prevent the secondary latch 44, specifically the latch hook end 52, from engaging the hook 54. In this figure it can also be seen that the linkage 84 connecting the secondary latch 44 to the primary hood latch 56 has been pulled to the top of the lost motion slot 90 so that both latches are unlatched.

In FIG. 5 the latch is being relatched. As the front hood section 24 is urged toward the rear hood section 22 the nosepiece 82 of the hood latch bolt 80 will enter the aperture 106 in the upwardly extending guide plate 110 displacing the catch 70 against the tension of spring 64. The catch 70 will slide up and over the nosepiece 82 until the front hood 24 is closed for enough to allow the catch 70 to enter the clearance 76 (FIG. 2). Notice that at the position of the components in FIG. 5 the secondary latch hook end 52 has already engaged hook 54. The tension spring 112 for the secondary latch has urged it into position while the independent pivoted catch 70 is rotated upwardly. The primary hood latch 56 and specifically the linkage means 84 is not displaced along the slot 90 as the aforementioned multi-component primary hood latch 56 allows the catch 70 to be rotated relatively upward while the unlatching lever 114 remains in its as latched position. At this point the spring 112 has also pulled the pull cable 40 back up the cable housing tube 120 so that the T-handle is repositioned and ready for the next unlatching operation.

FIG. 3 shows both the primary and secondary latches from the bottom looking up toward the vehicle hoods which have not been drawn in clarities' sake. This is a latched view that does show the unlatching bell crank lever tab 116 clearly adjacent one of the legs of the "U-shaped" catch 70. The significant feature shown in FIG. 3 is the hood release handle 122 having a lever portion 124 attached to a shaft 126 that also serves as and has been identified as the secondary latch pivot point 46. This shaft 126 has its alignment ensured by an apertured alignment plates 130 and 132. Pins means 134 passes through the tube 138 and the shaft 126 so the tube 138 will move relative to the motion of the hood release handle 122. The tube 138 is fastened to secondary latch 44. The hood release handle 122 is an auxiliary latching means that enables the tractor operator to open the hood by releasing the latches without pulling the T-handle 42. Since the hood release handle 122 can operate the secondary latch 44 by downward displacement on the lever 122 it can also operate the primary latch 56 through linkage means 84. In a preferred embodiment the lever 122 is accessed through openings on top of the hood (not shown).

It can be seen that the secondary latch will assist in keeping the front hood section 24 from rolling forward in cases where the primary latch is not fully engaged. Even though the secondary latch can assist in this control it is thought that latching of both the primary and secondary latches will best maintain the front hood in the closed position while allowing some ease of unlatching for convenience.

Thus, it can be seen that there has been provided a hood latch system specifically designed for a tractor vehicle having a hood that slides forward for access to the engine compartment that incorporates the advantages of a primary and secondary hood latch that can be operated by a remotely located handle or locally through a hood release lever.

This specification has set forth the preferred embodiment of the invention, however, nuances of design that fall within the spirit and scope of the following claims are contemplated by the inventor and are inherent in the appended claims.

What is claimed is:

1. In a tractor vehicle having an engine enclosing hood assembly utilizing a rear hood section and a front hood section mounted on rollers and capable of being rolled forward to provide access to said engine the improvement comprising:

a primary latch having a hood latch bolt horizontally fixed to a front hood bracket, a catch mounted for pivotal rotation on a primary pivot point mounted to said rear hood section, an unlatching bell crank lever pivotally mounted on said primary pivot point for urging said catch to an unlatched position;

a secondary latch pivotally mounted for limited motion to a secondary latch pivot point carried on said rear hood section, said secondary latch in close proximity to said primary latch and interconnected therewith through a linkage means connecting said secondary latch to said unlatching bell crank lever, said secondary latch extending forward from said rear hood section and including a latch hook and a hook fixed to said front hood bracket, said hook having an inclined face portion, said hook bite projecting toward the front of said vehicle for engagement with said latch hook;

a remote handle release connected by a cable to said secondary latch for urging said secondary latch away from said hook, said secondary latch progressively connected to said primary latch by said linkage means whereby said primary latch will be released after said secondary latch upon further displacement of said remote handle release;

a hood release handle located inside said engine compartment enclosure and accessible from outside said engine compartment enclosure pivotally mounted in said rear hood section connected to said secondary hood latch for unlatching said secondary hook latch from engagement with said hook.

2. The invention in accordance claim 1 wherein said primary latch is provided with a spring urging said catch to rotate on said primary pivot point to a position of restraint provided by said unlatching bell crank lever and said horizontally fixed hood latch bolt.

3. The invention in accordance with claim 2 wherein said unlatching bell crank lever is provided with an unlatching bell crank lever tab for contacting said catch to enable said catch to be rotated against the tension of said spring to disengage said catch from engagement with said hood latch bolt.

4. The invention in accordance with claim 3 wherein said secondary latch is interconnected with said unlatching bell crank lever through the said linkage means, said linkage means restrained at one end thereof in an aperture in a connecting link portion of said unlatching bell crank lever and at a second end thereof to a lost motion developing slot in said secondary latch.

5. The invention in accordance with claim 4 wherein said secondary latch is spring biased by means of a tension spring for said secondary latch to urge said latch hook into engagement with said hook affixed to said front hood bracket.

6. The invention in accordance with claim 5 wherein said secondary latch will be disengaged by displacement of said remote handle release and will progressively cause said primary latch to be disengaged upon further displacement of said remote handle release.

7. The invention in accordance with claim 5 wherein said secondary latch will be disengaged by displacement of said hood release handle and will progressively cause said primary latch to be disengaged upon further displacement of said hood release handle.

8. The invention in accordance with claim 1 wherein said secondary latch comprises:

first and second apertured alignment plates attached to an inside upper surface of said rear hood section;

a hood release handle having a shaft portion supported in said apertures of said first and second alignment plates and a lever portion extending from said shaft portion toward said front hood portion;

a tube carried on said shaft and fixed for rotation therewith, said tube fastened to said secondary latch for movement therewith;

a torsion spring carried on the exterior of said tube for urging said tube and said secondary latch to pivot on said shaft toward said hook on the interior of said front hood section;

an adjustable stop carried on said secondary latch contacting the inside surface of said rear hood portion when said secondary latch is urged by said torsion spring toward said hook;

a latch hook fixed to the forward end of said secondary latch whereby said latch hook will engage said hook when said torsion spring urges said secondary latch into a latched position.

9. The invention in accordance with claim 8 wherein said secondary latch will be released upon displacement of said lever portion of said hood release handle and said primary latch will be released upon further displacement of said handle.

10. The invention in accordance with claim 1 wherein said remote handle release will unlatch said secondary latch upon remote handle release displacement of between 150 mm and 170 mm and will unlatch said primary latch upon further displacement of said remote handle release of between 150 mm and 170 mm.

* * * * *